No. 680,569. Patented Aug. 13, 1901.
F. G. DAVIS.
MANUFACTURE OF VEHICLE TIRES.
(Application filed Sept. 11, 1900.)
(No Model.)
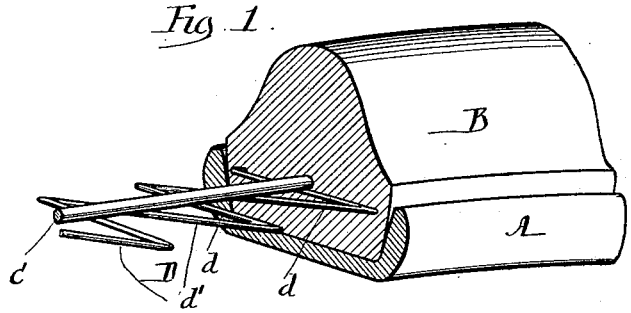
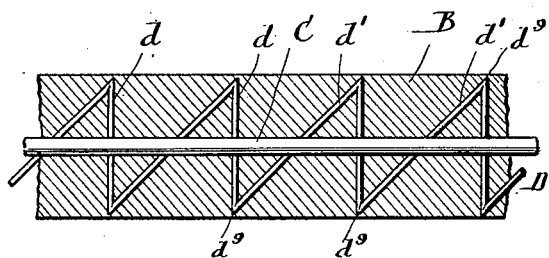
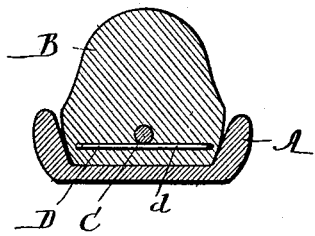
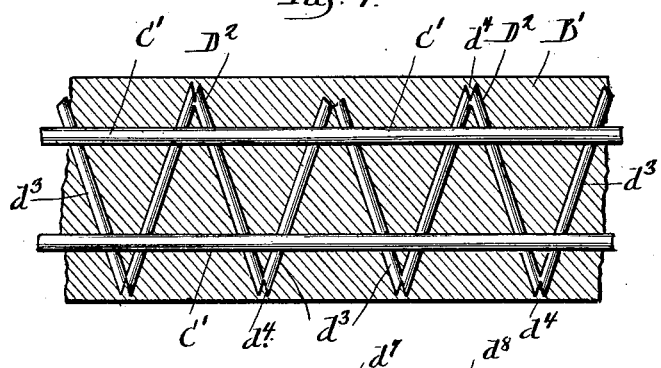
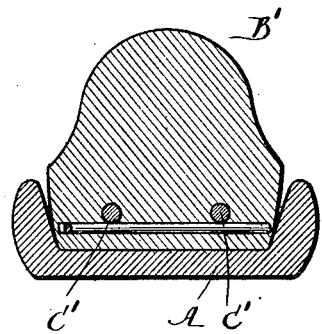
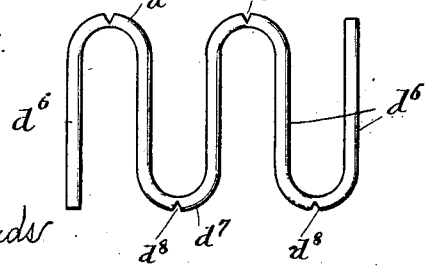
Witnesses:
Torris K. Alfords
Harry L. Clapp.
Inventor:
Frederick G. Davis,
By Fred Gerlach
his Attorney.
THE NORRIS PETERS CO., PHOTO-LITHO., WASHINGTON, D. C.

UNITED STATES PATENT OFFICE.

FREDERICK G. DAVIS, OF CHICAGO, ILLINOIS.

MANUFACTURE OF VEHICLE-TIRES.

SPECIFICATION forming part of Letters Patent No. 680,569, dated August 13, 1901.

Application filed September 11, 1900. Serial No. 29,736. (No model.)

*To all whom it may concern:*

Be it known that I, FREDERICK G. DAVIS, a resident of Chicago, in the county of Cook and State of Illinois, have invented certain new and useful Improvements in the Manufacture of Vehicle-Tires, of which I do declare the following to be a full, clear, and exact description.

The invention relates more particularly to that class of vehicle-tires commonly known as "cushion-tires"—i. e., those in which the body of the tire is made of elastic material.

It has heretofore been common practice to employ one or more longitudinal bands extended through the elastic body or strip of a tire to retain the strip seated within a channeled metallic rim. In applying such tires the elastic body is usually compressed along the band or bands and placed within the rim in compressed state. It has also been proposed to embed a series of cross-stays in the rubber strip to provide a metallic and firm support for the longitudinal band or bands, but which would not interfere with the compression of the elastic strip in longitudinal direction necessary in applying a tire to the rim. Such a construction of tire is shown in United States Letters Patent No. 622,120, granted March 28, 1899, to James Coomber.
In the manufacture of tires containing such cross-stays it has been found to be difficult to embed the cross-stays in true arrangement across the tire. The usual method used in the manufacture of said tires was as follows, viz: The mold was filled with rubber compound approximately to the height of the longitudinal opening for the retaining-wire, such portion forming the tread portion of the tire. The core for forming the longitudinal opening was then placed in position and the cross-stays were then laid upon the core. Compound was then added to form the bottom or rim portion of the tire. At times the compound was tamped and firmly packed within the mold to cause the necessary cohesion and uniform density in all portions of the tire, and the cover was then placed in position upon the mold. When manufacturing such tires according to this method, a great deal of care was required in placing the cross-stays in horizontal position across the mold and properly spaced therein, and, further-more, the cross-stays during the tamping and packing operation would frequently become disarranged—e. g., the cross-stay would be tilted vertically or twisted laterally. When such disarrangement would occur, the tire would be defective, because the cross-stays would not extend across the elastic body and the longitudinal band or bands and would not be uniformly and transversely disposed, as designed. The present invention designs, primarily, to overcome these objections to such method of manufacturing such tires and also to provide a tire in which the cross-stays are uniformly and properly disposed in the elastic body.

With these objects in view the invention consists, primarily, in embedding a strip or bar of metal, such as wire, extended back and forth in the elastic strip and weakening the sides or side portions to permit the elastic strip to be compressed longitudinally while being applied to a rim.

Another feature of the invention consists in employing cross-stays formed of wire extending back and forth across the elastic strip and beneath the longitudinal band and weakening the side portions or corners by partially cutting, bending, or reducing the wire to permit an extended cross stay or wire of some length to be employed, but which will permit the desired compression of the elastic body or strip and which will serve also as a firm support for the longitudinal band or bands.

The invention further consists in the several improvements in the manufacture of tires hereinafter described, illustrated in the accompanying drawings, and more particularly defined by claims at the conclusion hereof.

In the drawings, Figure 1 is a perspective view of a portion of a tire embodying one form of the invention. Fig. 2 is a view in horizontal section. Fig. 3 is a view in cross-section. Fig. 4 is a view in horizontal section of another form of the invention. Fig. 5 is a cross-section thereof, and Fig. 6 is a plan view of still another form of cross stay or support.

Referring to the form of the invention shown in Figs. 1 to 3, A denotes a channeled rim of usual shape, B an elastic body or strip of suitable form to be held within the channel of the rim, and C a retaining-band extended through a longitudinal bore or opening in the elastic strip. D is a cross-support beneath the retaining band or wire, which is formed of a strip of wire bent to form cross-stays $d$ and laterally and diagonally extending portions $d'$, extending between opposite ends of cross-stays $d$. The cross-stays $d$ and diagonal portions $d'$ extend substantially across the elastic strip and are arranged immediately beneath the retaining-band to provide a firm support for said band. The cross-stays being connected by the diagonal portions will be firmly held against displacement in the rubber compound by the core and the mold during the manufacture of this tire. In forming the cross-support the sides of the wire are bent rather abruptly, as at $d^9$, to weaken the support at such points and permit the strip to be compressed readily and longitudinally. In the smaller sizes of tires the cross-supports may be formed of thin flexible wire and may be of considerable length without interfering in material degree with the compression of the elastic strip longitudinally while the tire is being applied and will not affect the elasticity of the tire when in use.

In Figs. 4 and 5 of the drawings there is shown a form of tire embodying certain features of the invention and which is adapted more particularly for larger or wide tires. The elastic strip B' is provided with a plurality of retaining-bands C' C', and beneath the bands a series of cross-supports $D^2$ are embedded. Such cross-stays are formed of a metallic strip, such as wire, having portions or bars $d^3$ extending diagonally across the elastic strip and back and forth beneath the retaining-bands. The supports $D^2$ are preferably formed of sections of convenient length. The cross-stays have their sides or portions near the sides or corners weakened or reduced by cutting, stamping, or bending, as at $d^4$. Such construction is an important one, because stout wire may be used to provide a firm support for the retaining band or bands, but which will not prevent the compression of the elastic strip longitudinally when the tire is being applied to the wheel-rim, because the connecting sides, corners, or portions are so weak that the cross bars or portions will easily yield at such weakened portions or may be severed during the compression of the strip or while being in compressed state in the rim. It will be seen also that the sections are of such length that they will serve to properly position the cross-stays when being placed in the mold and while the packing of the rubber compound is being packed therein.

In Fig. 6 there is shown a slightly-modified form of cross-support formed of a strip of wire bent back and forth to extend across the elastic strip and having a plurality of bars or portions $d^6$ extended transversely and curved sides or laterally-extending portions $d^7$, which are reduced or weakened, as at $d^8$, to permit the cross-stay to be easily compressed.

The method of making these tires is as follows, viz: Rubber compound is first placed in the mold approximately to the height of the cross-stays. The core or cores for forming the longitudinal openings for the retaining-bands are then placed in position, and the cross-supports are then placed in position on the core or cores and between the sides of the mold. Rubber compound is then placed in the mold and then packed to give the tire a uniform and the desired density. It will be observed that all of the forms of cross-stays shown and described are provided with lateral extensions or connections, which serve to better position the cross-stays in the mold, and when such are used in manufacture the tires will be compressible longitudinally, and, furthermore, the cross-stays will be arranged truly and uniformly in the elastic strip. The cross-stays also provide a firm support for the retaining-band, which prevents the band from cutting or wearing the rubber beneath the band when in use.

The invention is not to be understood to be restricted to the precise form and manner of manufacture shown and described, but may be varied within wide limits without departing from the spirit of the invention. So, also, features thereof may be employed severally without its adoption in entirety.

Having thus described my invention, what I claim as new, and desire to secure by Letters Patent, is—

1. A vehicle-tire comprising an elastic body or strip having a longitudinal retaining-band, and one or more cross stays or supports for said band, formed of a metallic strip extended back and forth in the elastic strip and having weakened portions at or near its sides to permit longitudinal compression of the elastic strip.

2. A vehicle-tire comprising an elastic body or strip having a longitudinal retaining-band and one or more cross stays or supports for said band, formed of a strip of wire bent to extend back and forth in the strip and beneath the band, said strip having its sides or corners weakened to permit longitudinal compression of the elastic strip.

3. A vehicle-tire comprising a rim having a channel therein, an elastic body or strip in said rim, one or more cross-stays, formed of a metallic strip extended back and forth in the elastic strip and having weakened portions at or near its sides to permit longitudinal compression of the elastic strip and means for securing said strip in said rim.

FREDERICK G. DAVIS.

Witnesses:
FRED GERLACH,
TORRIS H. ALFORDS.